US009123132B2

(12) United States Patent
Tamura

(10) Patent No.: US 9,123,132 B2
(45) Date of Patent: Sep. 1, 2015

(54) IMAGE PROCESSING METHOD, IMAGE DISPLAY SYSTEM, AND COMPUTER PROGRAM

(75) Inventor: Hikaru Tamura, Kanagawa (JP)

(73) Assignee: Semiconductor Energy Laboratory Co., Ltd., Kanagava-ken (JP)

(*) Notice: Subject to any disclaimer, the term of this patent is extended or adjusted under 35 U.S.C. 154(b) by 1043 days.

(21) Appl. No.: 12/273,735

(22) Filed: Nov. 19, 2008

(65) Prior Publication Data
US 2009/0136158 A1 May 28, 2009

(30) Foreign Application Priority Data

Nov. 22, 2007 (JP) ................. 2007-302812

(51) Int. Cl.
G06T 7/20 (2006.01)
G06K 9/00 (2006.01)
G06T 5/00 (2006.01)
G09G 3/00 (2006.01)
G09G 3/20 (2006.01)
H04N 5/44 (2011.01)
H04N 13/00 (2006.01)
(Continued)

(52) U.S. Cl.
CPC .......... *G06T 7/2006* (2013.01); *G06K 9/00771* (2013.01); *G06T 5/008* (2013.01); *G09G 3/003* (2013.01); *G09G 3/2092* (2013.01); *H04N 5/44* (2013.01); *H04N 13/0003* (2013.01); *H04N 13/0018* (2013.01); *H04N 21/4318* (2013.01); *H04N 21/44008* (2013.01); *G06T 2207/10016* (2013.01); *G06T 2207/20144* (2013.01); *G09G 2320/0261* (2013.01); *G09G 2340/16* (2013.01); *H04N 21/816* (2013.01)

(58) Field of Classification Search
USPC ......... 382/100, 103, 107, 153, 173–174, 181, 382/190, 254–258, 260–266, 269, 274–275, 382/276, 282–284; 348/207.99, 348/208.99–208.6, 208.12–208.15, 222.1; 345/418, 581, 611–612, 617, 629, 634, 345/647
See application file for complete search history.

(56) References Cited

U.S. PATENT DOCUMENTS 5,025,143 A * 6/1991 Dayhoff ..................... 250/203.3
6,157,733 A 12/2000 Swain
(Continued)

FOREIGN PATENT DOCUMENTS

EP 1403819 A1 3/2004
EP 1 653 438 A2 5/2006
(Continued)

OTHER PUBLICATIONS

Invitation to pay additional fees (PCT Application No. PCT/JP2008/071279); International Searching Authority dated Dec. 16, 2008, 5 pages.
(Continued)

*Primary Examiner* — Randolph I Chu
*Assistant Examiner* — Nathan Bloom
(74) *Attorney, Agent, or Firm* — Fish & Richardson P.C.

(57) ABSTRACT

A moving object display region where a moving object is displayed and a background display region are extracted based on a difference image of frame images. Blurring processing such as averaging processing is performed on an image in the background display region. Processing for further sharpening an image, such as contrast enhancement, is performed on an image in the moving object display region.

30 Claims, 12 Drawing Sheets

(51) Int. Cl.
*H04N 21/43* (2011.01)
*H04N 21/44* (2011.01)
*H04N 21/81* (2011.01)
*H04N 21/431* (2011.01)

(56) References Cited

U.S. PATENT DOCUMENTS

| | | | |
|---|---|---|---|
| 6,282,317 B1 * | 8/2001 | Luo et al. | 382/203 |
| 6,392,620 B1 | 5/2002 | Mizutani et al. | |
| 6,614,415 B2 | 9/2003 | Mizutani et al. | |
| 6,646,687 B1 | 11/2003 | Vlahos | |
| 6,836,293 B2 | 12/2004 | Itoh et al. | |
| 7,142,203 B2 | 11/2006 | Hiroki et al. | |
| 7,227,893 B1 * | 6/2007 | Srinivasa et al. | 375/240.08 |
| 7,256,836 B2 | 8/2007 | Itoh et al. | |
| 7,418,150 B2 | 8/2008 | Myoga | |
| 7,477,289 B2 | 1/2009 | Kondo et al. | |
| 7,738,008 B1 * | 6/2010 | Ball | 348/159 |
| 8,139,896 B1 * | 3/2012 | Ahiska et al. | 382/298 |
| 8,605,113 B2 * | 12/2013 | Chen et al. | 345/620 |
| 2003/0086608 A1 * | 5/2003 | Frost et al. | 382/173 |
| 2004/0105493 A1 * | 6/2004 | Kondo et al. | 375/240.08 |
| 2006/0092164 A1 | 5/2006 | Takeuchi et al. | |
| 2006/0227862 A1 * | 10/2006 | Campbell et al. | 375/240 |
| 2007/0040823 A1 | 2/2007 | Hiroki et al. | |
| 2007/0086675 A1 | 4/2007 | Chinen et al. | |
| 2007/0103585 A1 | 5/2007 | Takeuchi et al. | |
| 2007/0166675 A1 * | 7/2007 | Atkins et al. | 434/236 |
| 2007/0230569 A1 | 10/2007 | Itoh et al. | |
| 2007/0234220 A1 * | 10/2007 | Khan et al. | 715/745 |
| 2007/0236603 A1 | 10/2007 | Itoh et al. | |
| 2008/0079852 A1 | 4/2008 | Nagaishi et al. | |
| 2008/0123966 A1 * | 5/2008 | Nishida et al. | 382/203 |
| 2009/0128478 A1 | 5/2009 | Dembo | |
| 2009/0225183 A1 | 9/2009 | Tamura | |

FOREIGN PATENT DOCUMENTS

| | | | | |
|---|---|---|---|---|
| EP | 1796045 A2 | 6/2007 | | |
| JP | 63157579 A | 6/1988 | | |
| JP | 04-302289 A | 10/1992 | | |
| JP | 8036145 A | 2/1996 | | |
| JP | 08185521 A | 7/1996 | | |
| JP | 08-340556 A | 12/1996 | | |
| JP | 09-204159 A | 8/1997 | | |
| JP | 10-111491 A | 4/1998 | | |
| JP | 10233919 A | 9/1998 | | |
| JP | 11224324 A * | 8/1999 | | |
| JP | 2000512833 A | 9/2000 | | |
| JP | 2001222264 A | 8/2001 | | |
| JP | 2001-296841 A | 10/2001 | | |
| JP | 2002-176613 A * | 6/2002 | | H04N 5/91 |
| JP | 2005229198 A | 8/2005 | | |
| JP | 2005277916 A | 10/2005 | | |
| JP | 2006-050070 | 2/2006 | | |
| JP | 2006-133384 A | 5/2006 | | |
| JP | 2007-109235 | 4/2007 | | |
| JP | 2007264722 A | 10/2007 | | |
| WO | 9848381 A1 | 10/1998 | | |
| WO | 2007/072598 A1 | 6/2007 | | |

OTHER PUBLICATIONS

International Search Report and Written Opinion (Application No. PCT/JP2008/071279), dated Feb. 3, 2009, 10 pages.

* cited by examiner

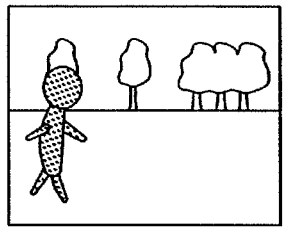
FIG. 8A
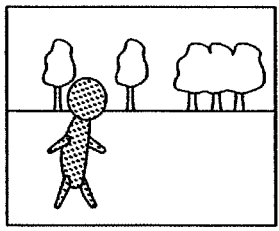
FIG. 8B
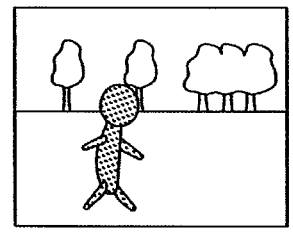
FIG. 8C
FIG. 8D
FIG. 8E
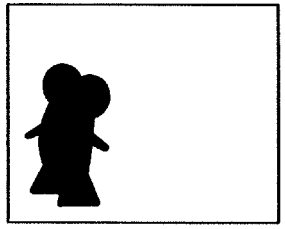
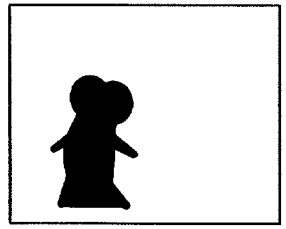
FIG. 8H
FIG. 8F
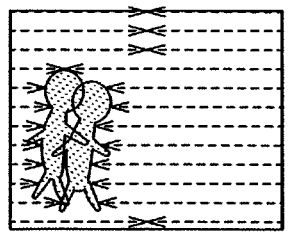
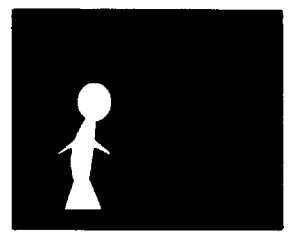
FIG. 8G
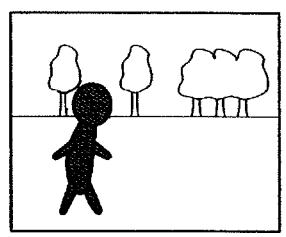

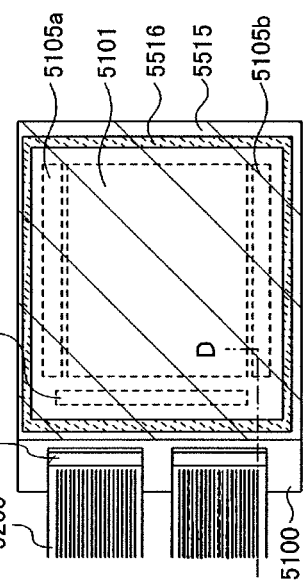
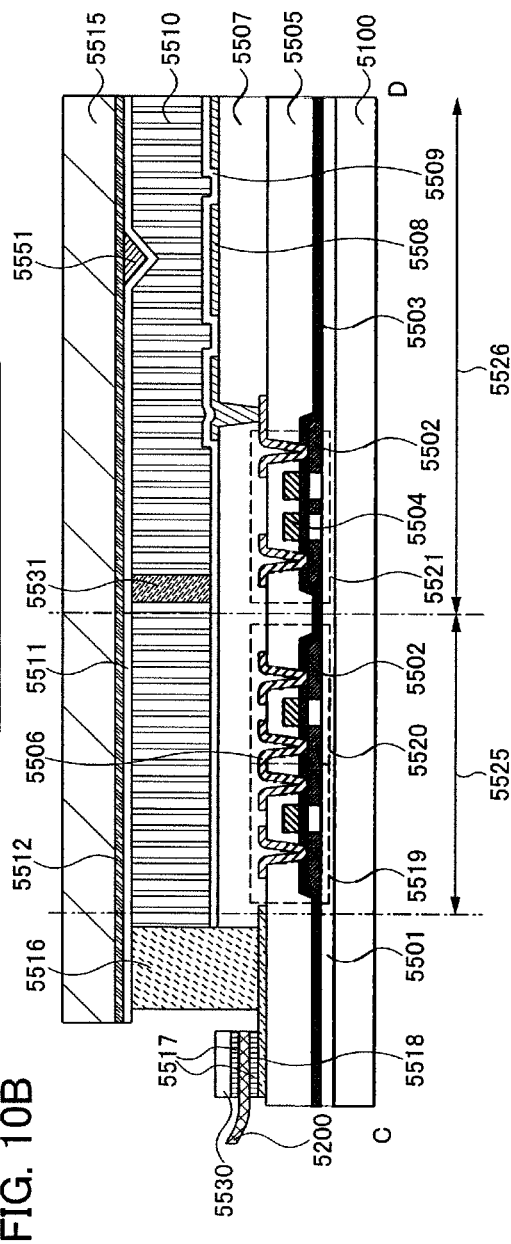
FIG. 10A
FIG. 10B

IMAGE PROCESSING METHOD, IMAGE DISPLAY SYSTEM, AND COMPUTER PROGRAM

TECHNICAL FIELD

The present invention relates to a method for processing moving images, an image display system for displaying moving images, and a computer program for processing moving images.

BACKGROUND ART

As physiological factors where a person sees objects three-dimensionally, there are binocular parallax, accommodation, convergence, motion parallax, and the like. A factor which most influences three-dimensional appearance among physiological factors in stereoscopic vision is binocular parallax for which three-dimensional information is obtained from difference in images in the horizontal direction seen by the left and right eyes. Accordingly, methods in which binocular parallax is used are the most common as three-dimensional display methods.

In a three-dimensional display method in which binocular parallax is used, an image for the left eye and an image for the right eye are displayed on one screen, and the left eye and the right eye see the respective corresponding images so that a combined image is three-dimensional. Accordingly, it is necessary for a person who sees a screen to wear special glasses so that the left eye and the right eye see different images.

Further, a display device for three-dimensional images, for which a person does not need to wear glasses, has been known. In such a display device for three-dimensional images, an optical component such as a parallax barrier, a lenticular lens, a micro lens array, or a fly eye lens is used to control a traveling direction of light from a screen, whereby the left eye and the right eye see different images, and stereoscopic vision is obtained (see Patent Document 1: Japanese Published Patent Application No. H8-036145).

DISCLOSURE OF INVENTION

In recent years, a liquid crystal display device and a plasma display device which have high definition and a large screen so that high definition images can be seen have been spread, and requests for the quality of images have been increased. One of the requests is realistic sense, which can be improved by increasing three-dimensional appearance and the depth.

However, in order to display images three-dimensionally by using binocular parallax, it is necessary to generate two images for the left eye and for the right eye. Moreover, in order to see three-dimensional images, a person who sees the images necessarily wears special glasses. In the case of eliminating the need to wear glasses, a special display device for stereoscopic vision as in Patent Document 1 is necessary.

In view of the foregoing problems, the present invention provides an image processing method by which moving images with improved three-dimensional appearance and depth can be displayed for a display device for displaying two-dimensional images.

The present invention also provides an image display system by which moving images with improved three-dimensional appearance and depth can be displayed for a display device for displaying two-dimensional images.

Moreover, the present invention provides a computer program for realizing an image processing method by which a moving image with improved three-dimensional appearance and depth can be displayed for a display device for displaying two-dimensional images.

One aspect of the present invention is an image processing method for a moving image including a plurality of frame images. A moving object display region where a moving object is displayed is extracted from at least one frame image. Different kinds of image processing are performed on a pixel included in the moving object display region and a pixel which is not included in the moving object display region in the frame image to generate a correction frame image. The image processing performed on the pixel which is not included in the moving object display region is blurring processing.

Another aspect of the present invention is an image processing method for a moving image including a plurality of frame images. A first binary difference image is generated based on a difference image between a target frame image to be subjected to correction and a frame image which is k frame (or k frames) before the target frame image (k is one of 1 and 2). A second binary difference image is generated based on a difference image between the target frame image and a frame image which is k frame (or k frames) after the target frame image. A moving object display region is extracted from the logical product of the first binary difference image and the second binary difference image to generate a mask image formed from the moving object display region and a background display region. Different kinds of image processing are performed on a pixel in the same position as a pixel included in the moving object display region and a pixel in the same position as a pixel included in the background display region in the target frame image to generate a correction frame image. The image processing performed on the pixel in the same position as the pixel included in the background display region is blurring processing.

Another aspect of the present invention is an image display system including an image display portion for displaying a moving image including a plurality of frame images; a moving object region extraction portion for extracting a moving object display region where a moving object is displayed from at least one frame image; and a correction frame image generation portion for generating a correction frame image by performing different kinds of image processing on a pixel included in the moving object display region and a pixel which is not included in the moving object display region in the frame image. The image processing performed on the pixel which is not included in the moving object display region is blurring processing. The correction frame image is displayed on the image display portion.

Another aspect of the present invention is an image display system including an image display portion for displaying a moving image including a plurality of frame images; a binary difference image generation portion for generating a first binary difference image based on a difference image between a target frame image to be subjected to correction and a frame image which is k frame (or k frames) before the target frame image (k is one of 1 and 2) and for generating a second binary difference image based on a difference image between the target frame image and a frame image which is k frame (or k frames) after the target frame image; a mask image generation portion for extracting a moving object display region from the logical product of the first binary difference image and the second binary difference image to generate a mask image formed from the moving object display region and a background display region; and a correction frame image generation portion for performing different kinds of image processing on a pixel in the same position as a pixel included in the moving object display region and a pixel in the same position as a pixel included in the background display region in the target frame image to generate a correction frame image. The image processing performed on the pixel in the same position as the pixel included in the background display region is blurring processing. The correction frame image is displayed on the image display portion.

In the image display system according to the present invention, when the moving object display region accounts for 50% or more of the target frame image, the target frame image can be displayed on the image display portion. Further, when the moving object display region accounts for 50% or more of the target frame image, the same image processing can be performed on the entire target frame image, and the target frame image on which the image processing is performed can be displayed on the image display portion.

Still another aspect of the present invention is a computer program used in an image processing device for a moving image for performing the following processing: processing for extracting a moving object display region where a moving object is displayed from a frame image forming a moving image; and processing for performing different kinds of image processing on a pixel included in the moving object display region and a pixel which is not included in the moving object display region in the frame image to generate a correction frame image. The image processing performed on the pixel which is not included in the moving object display region is blurring processing.

Another aspect of the present invention is a computer program used in an image processing device for a moving image for performing the following processing: processing for generating a first binary difference image based on a difference image between a target frame image to be subjected to correction among a plurality of target frame images forming a moving image and a frame image which is k frame (or k frames) before the target frame image (k is one of 1 and 2); processing for generating a second binary difference image based on a difference image between the target frame image and a frame image which is k frame (or k frames) after the target frame image; processing for extracting a moving object display region from the logical product of the first binary difference image and the second binary difference image to generate a mask image formed from the moving object display region and a background display region; and processing for performing different kinds of image processing on a pixel in the same position as a pixel included in the moving object display region and a pixel in the same position as a pixel included in the background display region in the target frame image to generate a correction frame image. The image processing performed on the pixel in the same position as the pixel included in the background display region is blurring processing.

In the present invention, at least one kind of image processing among sharpening processing, contrast enhancement processing, and edge enhancement processing can be performed on the pixel included in the moving object display region.

In the present invention, at least one kind of image processing among averaging processing, noise removal processing, contrast conversion processing for reducing contrast, and mosaic processing can be performed as the blurring processing.

According to the present invention, moving images with high three-dimensional appearance and realistic sense can be displayed in a display device for displaying two-dimensional images. For example, according to the present invention, a television image received by a television receiver can be converted into a moving image with high depth, whereby a television receiver with high added value can be provided.

BRIEF DESCRIPTION OF DRAWINGS

In the accompanying drawings:

FIGS. 8A to 8H illustrate an image processing method;

FIG. 10A is a top plan view of a structural example of an image output device, and FIG. 10B is a cross-sectional view thereof;

FIG. 12B illustrates a camera; and FIG. 12C illustrates a computer).

BEST MODE FOR CARRYING OUT THE INVENTION

Hereinafter, the present invention will be described with reference to the accompanying drawings. Note that the present invention can be implemented in various different ways, and it is easily understood by those skilled in the art that modes and details can be variously changed without departing from the spirit and the scope of the present invention. Therefore, the present invention should not be construed as being limited to the following description of the embodiment modes.

Embodiment Mode 1

In this embodiment mode, an image display device which displays a moving image including a plurality of frame images and an image display method are described.

Figure 1:
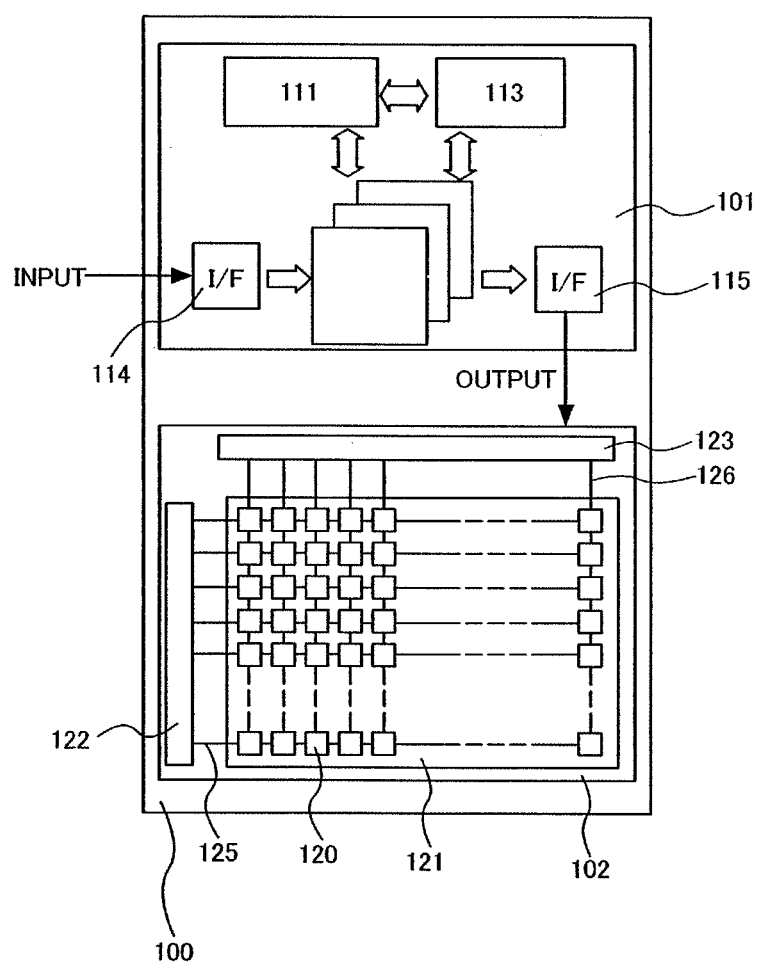
FIG. 1 is a block diagram illustrating a structural example of an image display system.

First, the structure of an image display system according to the present invention is described. FIG. 1 illustrates an image display system which displays a moving image including a plurality of frame images. An image display system 100 includes an image processing device 101 and an image output device 102.

The image processing device 101 extracts a moving object display region and a background display region which is the other region from at least one of a plurality of frame images which have been read. Moreover, for the frame image on which processing for extracting a moving object and a background is performed, the image processing device 101 performs different kinds of image processing on a pixel included in the moving object display region and a pixel included in the background display region, and generates a correction frame image.

Image data is output from the image processing device 101 to the image output device 102. In this embodiment mode, the image output device 102 is an image display device for displaying two-dimensional images and displays a moving image including a plurality of frame images.

As illustrated in FIG. 1, the image processing device 101 includes an arithmetic processing portion 111, a data storage portion 112, a control portion 113, an input-side interface portion 114, an output-side interface portion 115, and the like.

The arithmetic processing portion 111 performs various kinds of arithmetic processing such as arithmetic processing of image data and includes a CPU (central processing unit), an arithmetic circuit for image processing, and the like.

The data storage portion 112 includes various kinds of storage circuits for storing data for performing image processing in the image processing device 101. For example, the data storage portion 112 includes a ROM which stores a computer program with which the arithmetic processing portion 111 performs image processing, data of a filter for image processing, a look-up table, and the like; a RAM which stores an arithmetic result calculated by the arithmetic processing portion 111; a memory circuit which stores image data input to the image processing device 101; or the like. That is, a computer program for performing image processing of the present invention is stored in the data storage portion 112.

The control portion 113 includes a circuit for controlling circuits included in the image processing device 101. For example, a writing control circuit which controls writing of data in the data storage portion 112, a reading control circuit which controls reading of the data, and the like are included in the control portion 113.

The input-side interface portion 114 is a device for exchanging signals with an external device, for example, taking image data from an external device connected to the image processing device 101. For example, in order to process image data in the image processing device 101, the image data needs to be digital data. Accordingly, when the image data is analog data, the input-side interface portion 114 may be provided with an A/D converter (an analog-digital conversion circuit). The external device is a device outputting image data, for example, a photographic device such as a camera, or an image reproducing device for reproducing image data stored in a storage medium such as a hard disk or a DVD.

The output-side interface portion 115 is a device for outputting image data to the image output device 102 and exchanging signals with the image output device 102, for example. When the output-side interface portion 115 outputs an analog image signal to the image output device 102, the output-side interface portion 115 may be provided with a D/A converter (a digital-analog conversion circuit).

Examples of the image output device 102 having a function of displaying moving images are a liquid crystal display device, an electroluminescence display device, a field emission display, and a plasma display. FIG. 1 illustrates an example of the structure of the image output device 102. As illustrated in FIG. 1, the image output device 102 includes a display portion 121 including a plurality of pixels 120, a scan line driver circuit 122, a signal line driver circuit 123, and the like. In the display portion 121, the pixels 120 are arranged in M rows and N columns (each of M and N is a natural number). A scan line 125 and a signal line 126 are electrically connected to each pixel 120. Accordingly, each pixel 120 is electrically connected to the scan line driver circuit 122 and the signal line driver circuit 123.

The gray level (also referred to as concentration level) of each pixel 120 in the display portion 121 is determined by image data input from the image processing device 101. A signal for selecting the pixel 120 which is to perform display is input to the scan line 125 from the scan line driver circuit 122, and image data is input to the signal line 126 from the signal line driver circuit 123. The selected pixel 120 displays a tone determined by the image data.

Note that in FIG. 1, a display device for moving images is used for the image output device 102 so that a system in this embodiment mode is used as an image display system; however, a system of the present invention is not limited to the image display system. For example, when a moving image storage device provided with a storage medium for storing moving images, such as a hard disk, is used for the image output device 102, the system of this embodiment mode can be used as an image processing system.

Figure 2:
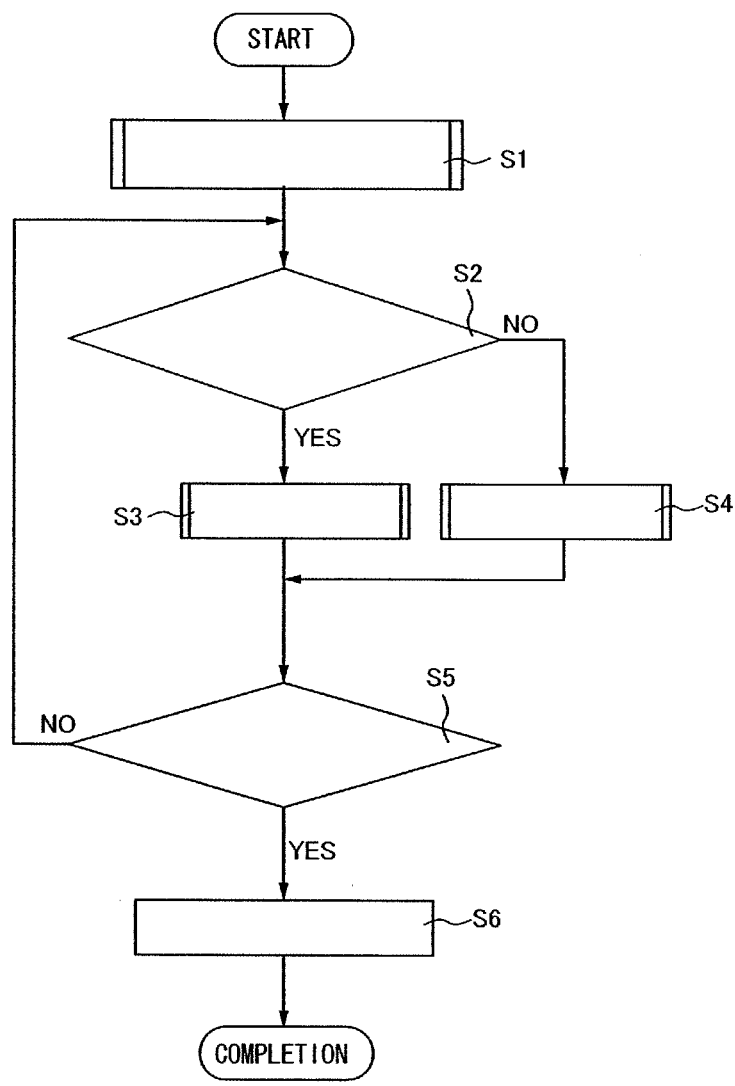
FIG. 2 is a flow chart of image processing.

Next, an image processing method that the image processing device 101 performs is described with reference to FIG. 2. FIG. 2 is a flow chart of an image processing method.

In a plurality of frame images forming a moving image, there is a portion where an image is changed in two successive frame images. In an image processing method of the present invention, whether a frame image includes an image with motion is determined, and different kinds of image processing are performed on an image in which change in motion is equal to or more than a given threshold and an image in which change in motion is less than the threshold to generate a correction frame image. In this specification, in a frame image, an image in which change in motion is equal to or more than a given threshold is referred to as a moving object, and an image of the other portions is referred to as a background.

In the image processing device 101, frame image data to be input is corrected, so that a corrected frame image (hereinafter referred to as a correction frame image) is generated. FIG. 2 is a flow chart in the case where a correction frame image is generated in the image processing device 101. It can also be said that the flow chart of FIG. 2 illustrates a computer program used for performing image processing in the image processing device 101. Hereinafter, a frame image for which a correction frame image is to be generated is referred to as a target frame image so that such a frame image is distinguished from other frame images.

In the image processing device 101, first, a moving object is extracted from a target frame image, and a region where the moving object is displayed (hereinafter referred to as a moving object display region) in the target frame image is determined (Step S1). This processing is referred to as processing for extracting a moving object display region. In the processing for extracting a moving object display region, by extracting the moving object from the target frame image, a background is also extracted, and a region where the background is displayed (hereinafter referred to as a background display region) is also extracted.

Next, in the image processing device 101, whether each pixel in the target frame image is a pixel in the moving object display region is determined (Step S2). Then, when the pixel in the target frame image is a pixel in the moving object display region, moving object image processing is performed (Step S3). When the pixel is not a pixel in the moving object display region, that is, when the pixel in the target frame image is a pixel in the background display region, background image processing is performed (Step S4). The moving object image processing is processing for correcting the gray level (luminance) of the pixel so that the gray level is suitable to be displayed as the moving object. The background image processing is processing for correcting the gray level (luminance) of the pixel so that the gray level is suitable to be displayed as the background.

Next, whether processing is performed on all the pixels in the target frame image is determined (Step S5), so that Step S2 to Step S5 are repeated. Then, one of the moving object image processing and the background image processing is performed on all the pixels, whereby a correction frame image is generated (Step S6).

Examples of the moving object image processing are contrast conversion processing for enhancing contrast (contrast enhancement processing), sharpening processing, unsharp masking processing, and edge enhancement processing. That is, the moving object image processing has effects of sharpening and enhancing a portion with motion, for example. In Step S3, at least one kind of image processing is performed among plural kinds of appropriate image processing.

On the other hand, the background image processing is blurring processing. By blurring a background, an effect is produced such that a person who sees an image has a sense that a moving object is in focus. Examples of the blurring processing are averaging processing, contrast conversion processing for reducing contrast, noise removal processing, and mosaic processing. That is, the background image processing is image processing which has an effect of suppressing the amount of information obtained from an image, for example, blurring or lightening a still portion and a portion with little motion. In Step S4, at least one kind of image processing is performed among plural kinds of appropriate image processing.

In the image processing device 101, processing of Step S1 to Step S6 is sequentially performed on a plurality of frame images forming a moving image. A correction frame image is output from the image processing device 101 to the image output device 102. In the image output device 102, the moving image including a plurality of correction frame images is displayed on the display portion 121.

The image processing device 101 performing the processing in FIG. 2 serves as a moving object region extraction portion which extracts a moving object display region where a moving object is displayed from a target frame image, and also serves as a correction frame image generation portion which processes a target frame image to generate a correction frame image.

In the image processing of FIG. 2, in a target frame image, pixels on which the moving object image processing should be performed and pixels on which the background image processing should be performed are sorted, and appropriate image processing is performed on each pixel, whereby a correction frame image is generated. Accordingly, a correction frame image gives a person who sees an image a sense that a moving object is in focus because a background is blurred and a moving object is emphasized. That is, in the image processing of the present invention, focus adjustment of the human eye is performed in advance by the image processing. The sense that not a background but a portion with motion is in focus can be easily given to the person who sees an image, whereby the depth and sense of distance of two-dimensional moving images can be increased. Accordingly, the person who sees the display portion 121 can see moving images with improved depth and sense of distance. That is, according to the present invention, three-dimensional appearance and realistic sense of two-dimensional moving images can be increased.

Note that as the processing for extracting a moving object display region, a variety of methods for extracting a moving object can be used. It is preferable to use a method for generating a difference image from the difference between two frame images because arithmetic processing can be easily performed. Obtaining the difference between images refers to calculating the absolute value of the difference between gray levels of a pixel in the same position. A difference image refers to an image in which the gray level of each pixel is the absolute value of the difference of gray levels in two images.

Figure 3:
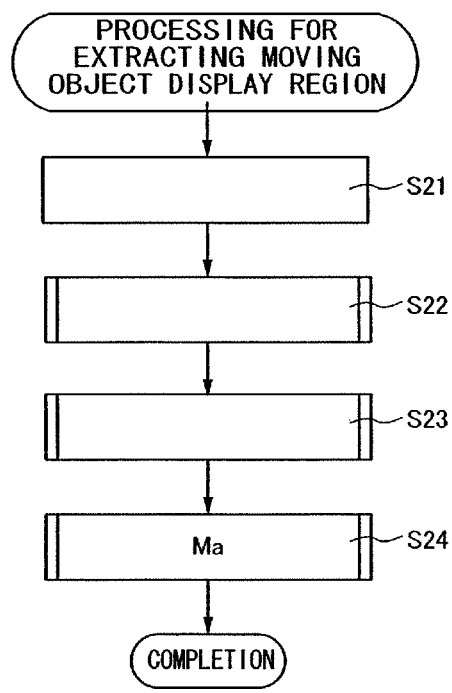
FIG. 3 is a flow chart of processing for extracting a moving object display region.

In this embodiment mode, two difference images are generated from three frame images fa−1, fa, and fa+1 which are temporally sequential, with the target frame image fa provided in the center, so that a moving object display region in the target frame image fa is specified. FIG. 3 is a flow chart of processing for extracting a moving object display region.

The image processing device 101 reads three frame images fa−1, fa, and fa+1 (Step S21). Data of the read frame images fa−1, fa, and fa+1 is written to the data storage portion 112. The frame image fa is the target frame image. Note that three frame images to be subjected to processing are not limited to the images which are just before and just after the target frame image fa. The target frame image fa and frame images fa−2 and fa+2 which are two frames before and after the target frame image fa may be used.

Next, processing for generating a difference image is performed (Step S22). In Step S22, the difference between the frame image fa−1 and the target frame image fa is calculated to generate a difference image g(a−1, a), and a difference image g(a, a+1) is generated from the difference between the frame image fa+1 and the target frame image fa. Data of the difference images g(a−1, a) and g(a, a+1) is written to the data storage portion 112.

Then, processing for generating a binary difference image is performed in which the difference images g(a−1, a) and g(a, a+1) are binarized to generate binary difference images h(a−1, a) and h(a, a+1) (Step S23). In this processing, whether the gray level of each pixel in the difference image is equal to or higher than a threshold or lower than the threshold is determined in the arithmetic processing portion 111, and the gray level of a pixel corresponding to the binary difference image is set to be the gray level for black display (the minimum gray level) or the gray level for white display (the maximum gray level). Data of the binary difference images h(a−1, a) and h(a, a+1) is written to the data storage portion 112.

Next, processing for generating a mask image is performed in which a mask image Ma with a moving object display region or a background display region used as a mask is generated based on the binary difference images h(a−1, a) and h(a, a+1) (Step S24). The processing for generating a mask image is such that in the arithmetic processing portion 111, a binary mask image Ma generated from a moving object display region and a background display region is generated by calculating the logical product (AND) of the binary difference images h(a−1, a) and h(a, a+1). Data of the mask image Ma is written to the data storage portion 112.

Figure 4:
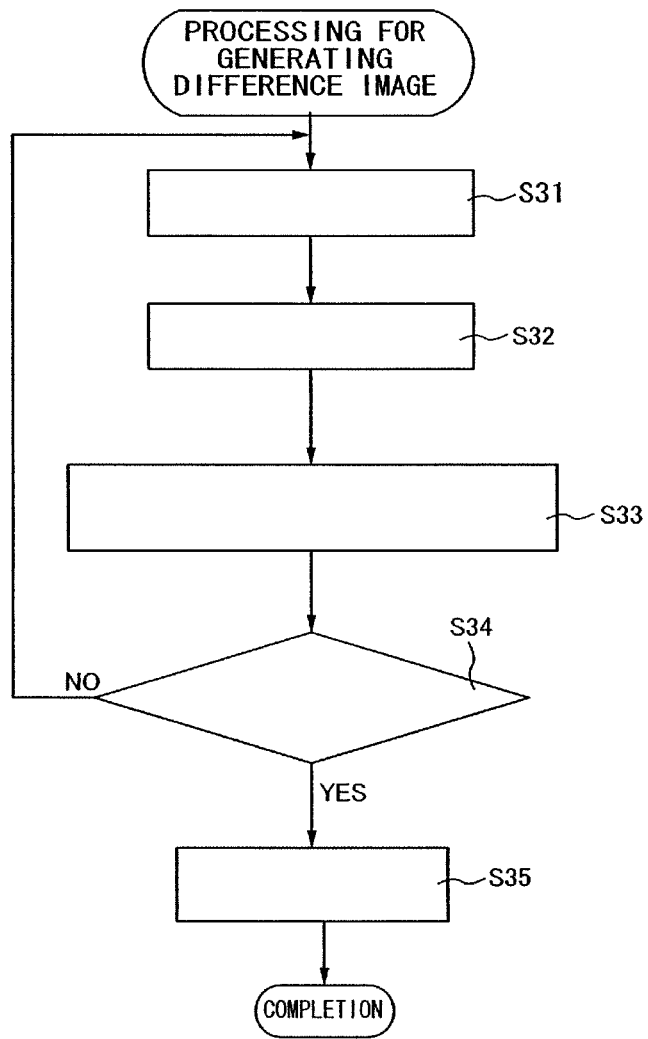
FIG. 4 is a flow chart of processing for generating a difference image.

FIG. 4 is a flow chart of processing for generating a difference image. FIG. 4 illustrates a method for generating the difference image g(a−1, a) from the frame image fa−1 and the target frame image fa. The difference image g(a, a+1) is generated in a similar manner. First, the gray level of a pixel (x, y) in the target frame image fa is read in the arithmetic processing portion 111 (Step S31), and the gray level of the pixel (x, y) in the frame image fa−1 is read in the arithmetic processing portion 111 (Step S32).

Data of the pixel (x, y) includes data for specifying one color. When the display portion 121 in the image output device 102 has a structure where the pixel 120 with three color elements of red (R), green (G), and blue (B) expresses one color, the data of the pixel (x, y), which is the minimum unit of image data, includes gray levels of R, G, and B. Note that a color other than RGB may be used for the color elements. For example, yellow, cyan, and magenta may be used. In this specification, the data of the pixel (x, y) includes gray levels of three colors of R, G, and B.

Next, in the arithmetic processing portion 111, the difference between the gray level of the pixel (x, y) read in Step S31 and the gray level of the pixel (x, y) read in Step S32 is calculated (Step S33). In Step S33, the absolute value of the difference of the gray levels is calculated. Specifically, the absolute value of the difference of the gray levels for each of R, G, and B is calculated. The absolute value of the difference calculated in Step S33 is the gray level of the pixel (x, y) in the difference image g(a−1, a), which is stored in a memory circuit for the difference image g(a−1, a) in the data storage portion 112.

Next, whether calculation of the difference of gray levels is performed on all the pixels is determined (Step S34), so that Step S31 to Step S34 are repeated. Then, calculation of the difference of gray levels is performed on all the pixels, whereby the difference image g(a−1, a) is generated (Step S35).

Figure 5:
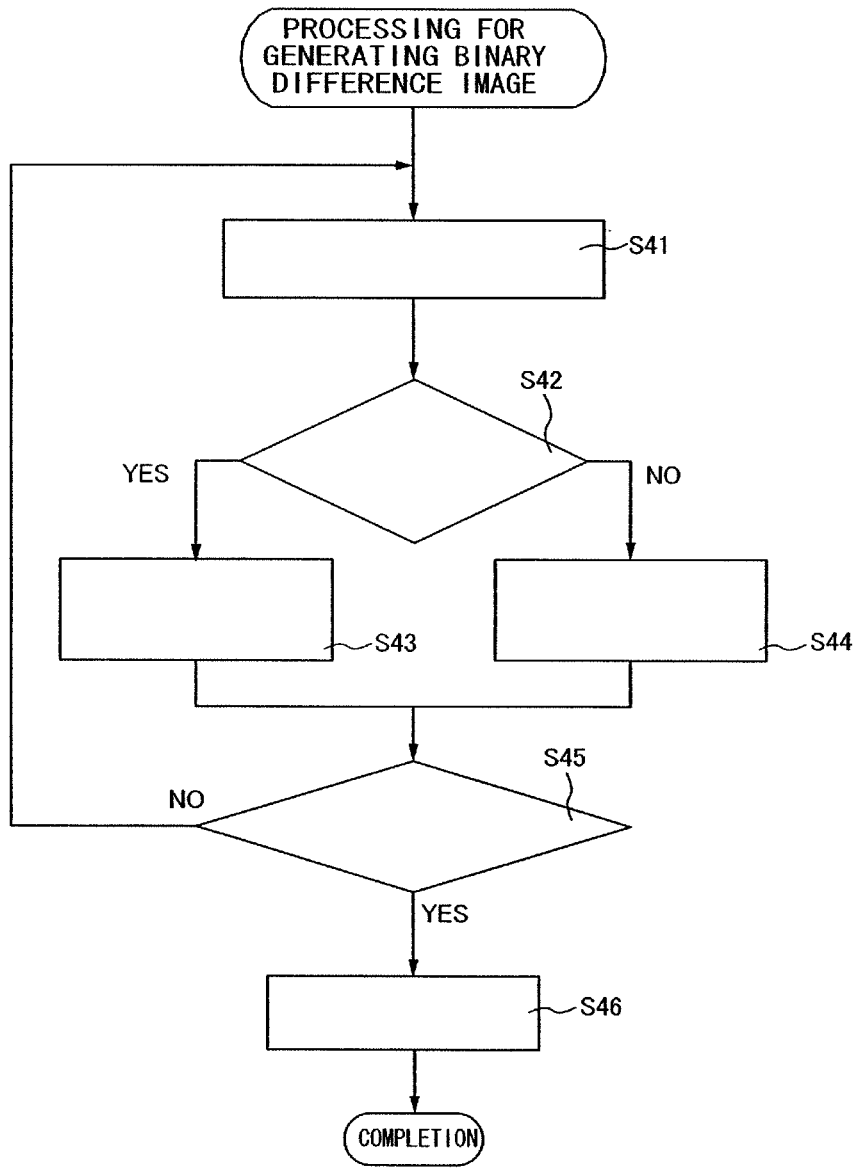
FIG. 5 is a flow chart of processing for generating a binary difference image.

Next, processing for generating a binary difference image is described. FIG. 5 is a flow chart of processing for generating a binary difference image. FIG. 5 illustrates a method for generating the binary difference image h(a−1, a) from the difference image g(a−1, a). The binary difference image h(a, a+1) is generated in a similar manner. First, the gray level of the pixel (x, y) in the difference image g(a−1, a) is read in the arithmetic processing portion 111 (Step S41).

Then, whether the gray level of the pixel (x, y) is equal to or higher than a threshold is determined in the arithmetic processing portion 111 (Step S42). In Step S42, whether the gray level of each color is equal to or higher than the threshold is determined and majority decision processing is performed, whereby whether the gray level of the pixel (x, y) is equal to or higher than the threshold is determined. When the gray level is equal to or higher than the threshold, the gray level of the pixel (x, y) in the binary difference image h(a−1, a) is set to be for black display (Step S43). When the gray level is lower than the threshold, the gray level of the pixel (x, y) in the binary difference image h(a−1, a) is set to be for white display (Step S44). The gray levels determined in Step S43 and Step S44 are stored in a memory circuit for the binary difference image h(a−1, a) in the data storage portion 112. Note that the threshold may be set for each of R, G, and B or may be the same value.

Next, whether processing is performed on all the pixels in the difference image g(a−1, a) is determined (Step S45), so that Step S41 to Step S45 are repeated. Then, a value of the pixel (x, y) in the binary difference image h(a−1, a) is calculated in all the pixels, whereby the binary difference image h(a−1, a) obtained by binarizing the difference image g(a−1, a) is generated (Step S46).

In the flow of FIG. 5, in the binary difference image h(a−1, a), a portion where gray levels are not changed or the amount of change is small between the frame image fa−1 and the target frame image fa is displayed as white, and a portion where gray levels are changed is displayed as black.

Figure 6:
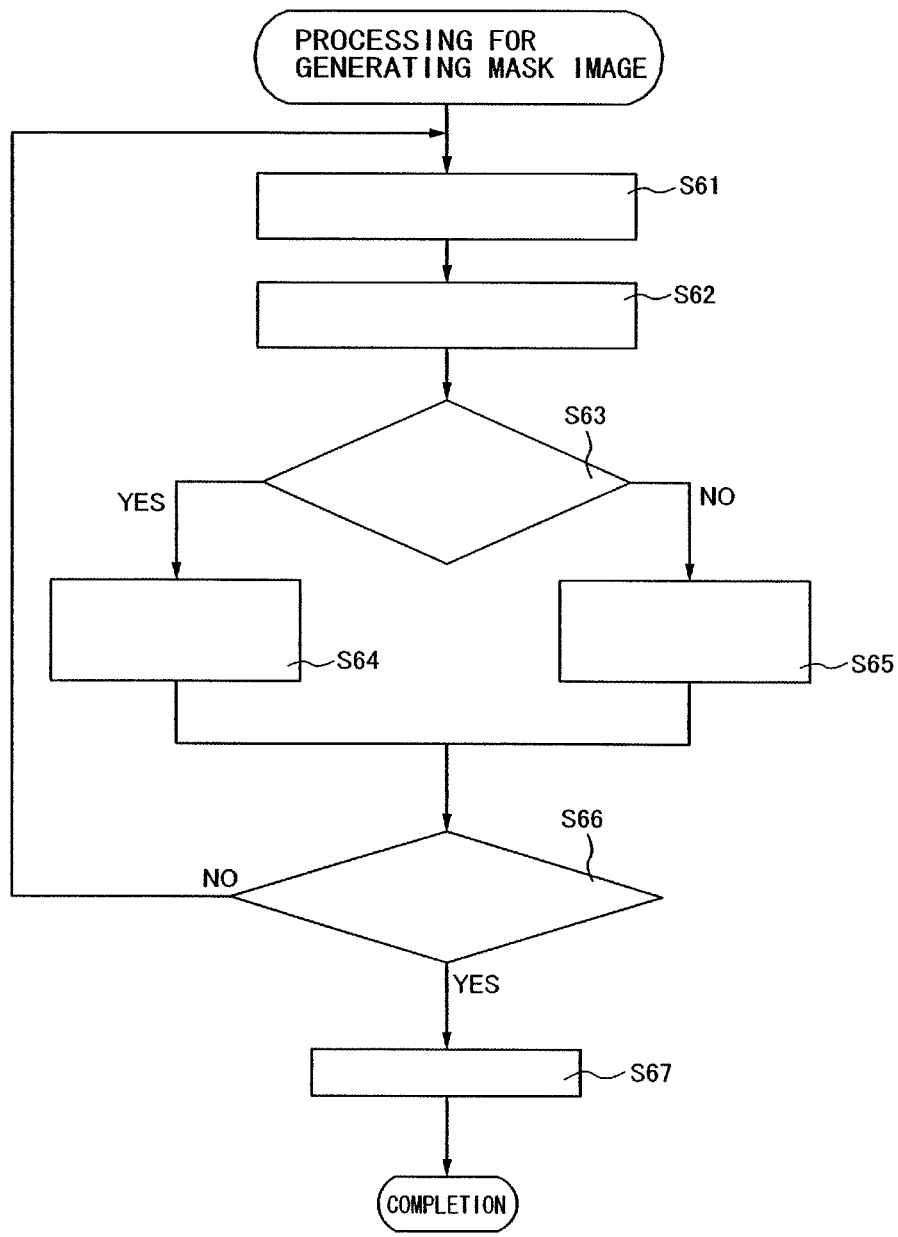
FIG. 6 is a flow chart of processing for generating a mask image.

Next, processing for generating a mask image is described. FIG. 6 is a flow chart of processing for generating a mask image. First, the gray level of the pixel (x, y) in the binary difference image h(a−1, a) is read in the arithmetic processing portion 111 (Step S61), and the gray level of the pixel (x, y) in the binary difference image h(a, a+1) is read in the arithmetic processing portion 111 (Step S62).

Next, whether both two gray levels of the pixel (x, y) taken in Step S61 and Step S62 are the gray levels for black display is determined in the arithmetic processing portion 111 (Step S63). In the case where both of these two gray levels are for black display, the gray level of the pixel (x, y) in the mask image Ma is set for white display (Step S64). In the other cases, the gray level of the pixel (x, y) in the mask image Ma is set for black display (Step S65). That is, in Step S63 to Step S65, the logical product (AND) of the binary difference images h(a−1, a) and h(a, a+1) is calculated. The gray levels determined in Step S64 and Step 65 are stored in a memory circuit for the mask image Ma in the data storage portion 112.

Then, whether the determination of gray levels in all the pixels is performed is determined (Step S66), so that Step S61 to Step S66 are repeated. Gray levels of the mask image Ma are calculated in all the pixels, whereby the mask image Ma is generated (Step S67). In the flow of FIG. 6, a region of the mask image Ma, which is displayed as white, is a moving object display region, and a region which is displayed as black is a background display region.

Figure 7:
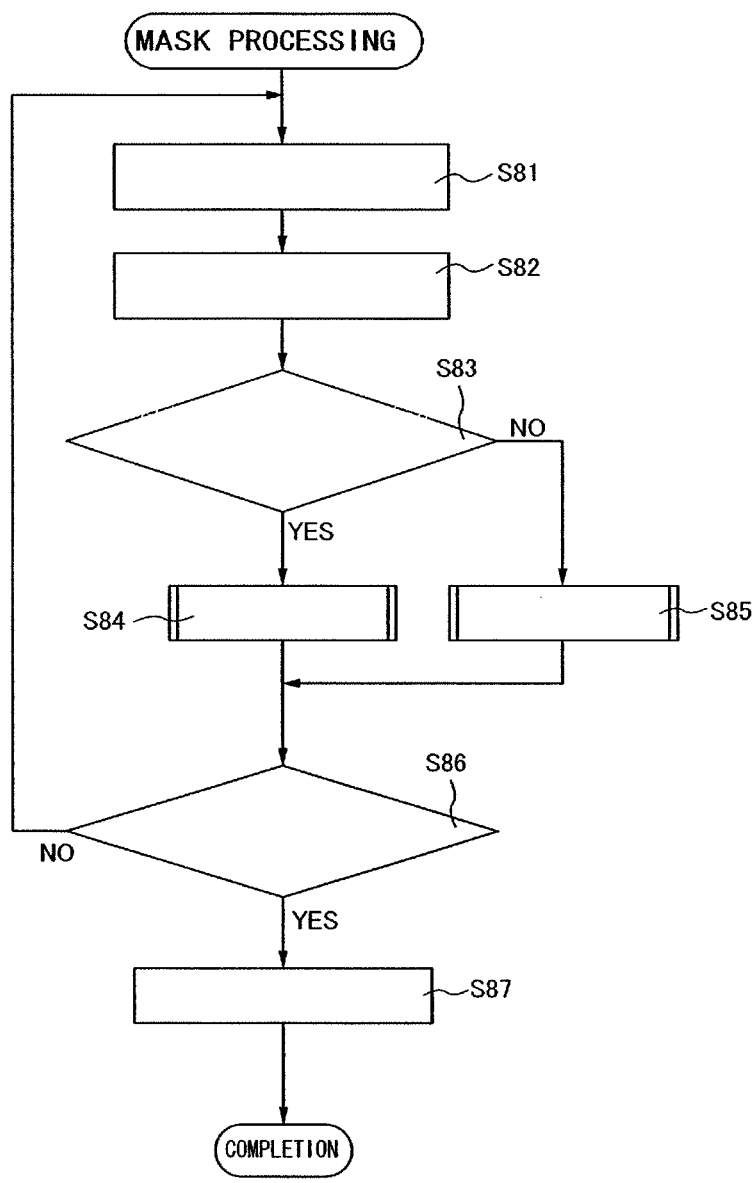
FIG. 7 is a flow chart of mask processing.

Next, a method for performing Step S2 in FIG. 2 by using the mask image Ma generated through the flow of FIG. 6 is described. In this embodiment mode, image processing in which Step S2 to Step S6 are performed using the mask image Ma is referred to as mask processing. FIG. 7 is a flow chart of mask processing.

First, the gray level of the pixel (x, y) in the target frame image fa is read in the arithmetic processing portion 111 (Step S81), and the gray level of the pixel (x, y) in the mask image Ma is read in the arithmetic processing portion 111 (Step S82). Next, whether the gray level of the pixel (x, y) in the mask image Ma is the gray level for white display is determined (Step S83). When the gray level is for white display, the gray level of the pixel (x, y) in the target frame image fa is corrected by moving object image processing (Step S84). When the gray level is not for white display (i.e., the gray level is for black display), the gray level of the pixel (x, y) in the target frame image fa is corrected by background image processing (Step S85). The gray levels determined in Step S84 and Step S85 are stored in a memory circuit for a correction frame image Fa in the data storage portion 112.

Next, whether processing is performed on all the pixels is determined (Step S86), so that Step S81 to Step S86 are repeated. Gray levels of the correction frame image Fa are calculated in all the pixels, whereby the correction frame image Fa is generated (Step S87).

That is, the image processing device 101 performs through the flow of FIG. 3, FIG. 4, FIG. 5, FIG. 6, and FIG. 7 to generate the correction frame image Fa. The image processing device 101 includes a difference image generation portion for generating a difference image from frame images, a binary difference image generation portion for generating a binary image based on a difference image, a mask image generation portion for generating the mask image Ma, and a correction frame image generation portion for generating a correction frame image.

Next, an image processing method for generating the correction frame image Fa by performing the flow of FIG. 3, FIG. 4, FIG. 5, FIG. 6, and FIG. 7 is specifically described by using images. FIGS. 8A to 8H illustrate an image processing method.

In FIGS. 8A to 8C, moving images are assumed in which a person moves from left to right in front of a grove. FIG. 8A illustrates the frame image fa−1. FIG. 8B illustrates the target frame image fa. FIG. 8C illustrates the frame image fa+1. By performing processing for generating a difference image and processing for generating a binary difference image, the binary difference images h(a−1, a) and h(a, a+1) illustrated in FIGS. 8D and 8E are generated. As is apparent from FIGS. 8D and 8E, in the binary difference images h(a−1, a) and h(a, a+1), a portion without motion common to two frame images is displayed as white, and a portion with motion in at least one of the two frame images (i.e., a portion where moving objects overlap with each other) is displayed as black.

Note that in the processing for generating a binary difference image, when pixels subjected to calculation of the difference between the gray level and a threshold are specified while being shifted in one direction, for example, left to right or right to left, a white hole is made in a part where moving objects overlap with each other in some cases (a black part in each of FIGS. 8D and 8E). In order to avoid this, as illustrated in FIG. 8H, a pixel whose gray level is calculated is specified as follows: a difference image is scanned from opposite left and right ends in the horizontal direction; a pixel whose gray level is higher than a threshold is considered as an edge of the moving object; and an intermediate pixel is forced to be considered as the moving object. By performing such processing, the moving objects can be extracted as one unit without making a hole (a white part) inside as illustrated in FIGS. 8D and 8E. Note that a difference image may be scanned from opposite top and bottom ends in the perpendicular direction; a pixel whose gray level is higher than a threshold may be considered as an edge of the moving object; and an intermediate pixel may be forced to be considered as the moving object.

The logical product of the binary difference images h(a−1, a) and h(a, a+1) is calculated by the processing for generating a mask image, whereby the mask image Ma illustrated in FIG. 8F is generated. A white part of the mask image Ma is a moving object display region. Then, by performing the mask processing, the moving object image processing is performed on part of the target frame image fa, which overlaps with the moving object display region (the white image) of the mask image Ma, and the background image processing is performed on another part of the target frame image fa, which overlaps with a background display region (the black image). Accordingly, the correction frame image Fa illustrated in FIG. 8G is generated.

Since the background is blurred and the moving object is emphasized in the correction frame image Fa, the correction frame image Fa gives a person who sees the image a sense that the moving object is in focus. Correction frame images are generated with respect to a plurality of frame images forming a moving image, and each correction frame image is output to the image output device 102, whereby two-dimensional moving images with improved depth and sense of distance are displayed on the display portion 121. Accordingly, a person who sees the display portion 121 can feel realistic sense and three-dimensional appearance.

In order to extract a moving object display region from a target frame image more accurately, a difference image may be generated after image processing is performed on a frame image to be subjected to processing in the image processing device 101. Examples of such image processing are averaging processing, filter processing using a linear primary differential filter in the horizontal direction, edge detection processing, and noise removal processing using a median filter or the like.

In addition, in the case where two successive frame images are widely different from each other (e.g., in the case where backgrounds are completely different between the frame image fa−1 and the target frame image fa), the display quality of a moving image might deteriorate when a correction frame image is displayed on the display portion 121. Accordingly, when a moving object display region accounts for 50% or more, or 70% or more of the target frame image fa, it is preferable that the mask processing in FIG. 6 be not performed on the target frame image and the target frame image fa be output to the image output device 102 and displayed on the display portion 121. Note that in this case, instead of performing the mask processing in FIG. 6, image processing such as gamma correction, edge enhancement, or contrast conversion processing may be performed on the entire target frame image fa, and the target frame image fa which has been subjected to image processing may be output to the image output device 102.

The proportion of the moving object display region to the target frame image fa is calculated by the arithmetic processing portion 111 in the image processing device 101. The proportion can be calculated from the number of pixels included in the moving object display region (the white display region in this embodiment mode) of the mask image Ma and the total number of pixels forming the mask image Ma.

Embodiment Mode 2

The entire correction frame image generated by performing moving object image processing and background image processing may be further subjected to the same image processing by the image processing device 101, so that the correction frame image after the image processing can be displayed in the image output device 102. An example of such image processing is gamma correction processing. In this embodiment mode, an example of gamma correction processing is described.

Gamma correction processing refers to processing by which brightness (luminance) of a pixel is adjusted by converting the gray level (the luminance level) with an exponential function of the gray level. When image data is assumed to be 8-bit data, the exponential function for gamma correction is represented by Formula 1.

[Formula 1]

$$Y_c = 255 \times (Y \div 255) 1/\gamma \tag{1}$$

In Formula 1, Y represents the gray level before correction, and $0 \le Y \le 255$. $Y_c$ represents the gray level after the gamma correction. Moreover, $\gamma$ is a gamma value and a constant. The gamma value is set for each of R, G, and B. An image is brighter when the gamma value is greater than 1.0, and an image is darker when the gamma value is less than 1.0. Note that when n-bit gray level is corrected, an exponential function in which a value of 255 in Formula 1 is changed to $2^n-1$ is used, and $0 \le Y \le 2^n-1$.

Gamma correction processing using the exponential function of Formula 1 can be performed on a correction frame image. Alternatively, gamma correction processing using an exponential function different from that of Formula 1 can be performed. As a specific example, gamma processing for correcting the gray level so that a dark image and a bright image are emphasized is described below. Formula 2 is an example of a gamma correction function with which such gamma correction processing can be performed. Formula 2 represents a gamma correction function for correcting 8-bit gray level.

[Formula 2]

$$Y_c = \frac{255 \left[ \sum_{j=1}^{M} (Y \div 255) \frac{1}{\alpha_j} + \sum_{k=1}^{N} (Y \div 255) \frac{1}{\beta_k} \right]}{M + N} \tag{2}$$

$0 < \alpha_j < 1, \beta_k > 1$ $M \ge 1, N \ge 1$ (each of M and N is an integer)

In Formula 2, each of $\alpha_j$ and $\beta_k$ is a gamma value. That is, Formula 2 represents a function in which the sum of a function of Formula 1 where the gamma value γ is less than 1 and a function of Formula 1 where the gamma value γ is greater than 1 is the numerator and the number of functions for calculating the sum is the denominator. The gamma values $α_j$ and $β_k$ are set for each of R, G, and B.

Formula 2 represents the gamma correction function for correcting the 8-bit gray level. When the n-bit gray level is corrected, an exponential function in which a value of 255 in Formula 2 is changed to $2^n-1$ is used, and $0≤Y≤2^n-1$.

Figure 9:
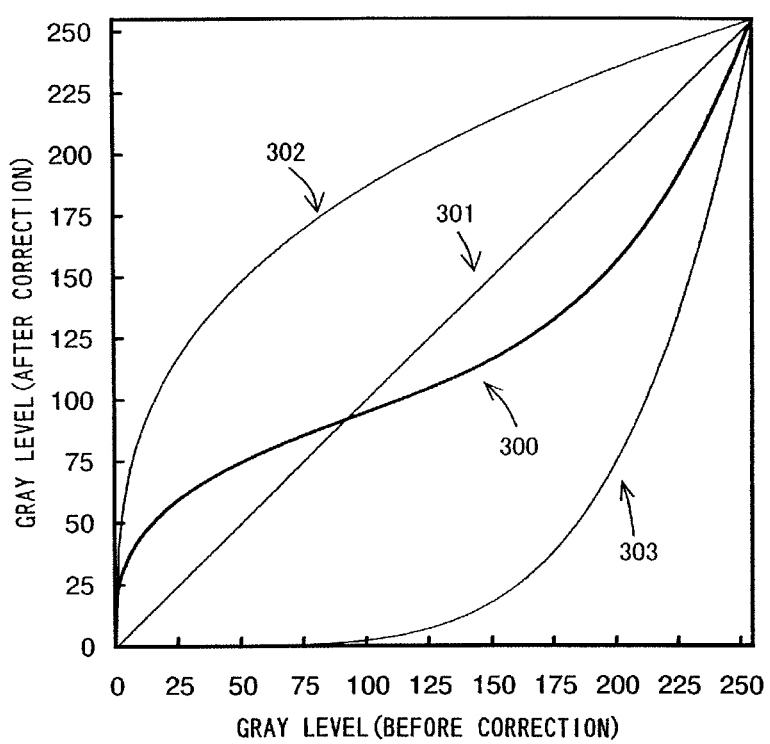
FIG. 9 is a graph of a gamma correction function.

FIG. 9 illustrates a specific example of Formula 2. In FIG. 9, a curve 300 is a graph obtained by giving shape to Formula 2 and is represented by Formula 3. Formula 3 represents a gamma correction function obtained by substituting $α_1=0.2$, $β_1=3$, N=1, and M=1 into Formula 2. That is, Formula 3 represents a function obtained by dividing the sum of an exponential function into which the gamma value γ=0.2 is substituted and an exponential function into which the gamma value γ=3 is substituted by 2.

[Formula 3]

$$Y_c = \frac{255\left[(Y \div 255)\frac{1}{0.2} + (Y \div 255)\frac{1}{3}\right]}{2} \quad (3)$$

Further, a straight line 301 and curves 302 and 303 are obtained by substituting the gamma values γ of 1, 3, and 0.2 into Formula 1, respectively. In particular, the straight line 301 is a linear function represented by $Y_c=Y$.

As shown by the curve 300, the gamma correction function represented by Formula 2 is a curve having one intersection with the straight line 301 ($Y_c=Y$), in which the gamma value γ is 1 in Formula 1, in the range where 0<Y<255. With the intersection used as a boundary, on the lower gray level side, the gray level after the correction is higher than that before the correction. In contrast, on the higher gray level side, the gray level after the correction is lower than that before the correction.

Further, in the gamma correction function represented by Formula 2, change in gray level after the correction is larger than change in gray level before the correction on both the lower and higher gray level sides. Accordingly, by performing gamma correction processing using the correction function of Formula 2, contrast can be enhanced in an image with a lot of bright portions and dark portions. This can be understood from comparison of the curve 300 and the straight line 301.

Moreover, by the gamma correction processing using the correction function of Formula 2, contrast is reduced in an image with a lot of halftones. Accordingly, the gamma correction processing using the correction function can be performed as background image processing.

Note that as described in Embodiment Mode 1, when not a correction frame image but a target frame image is output to the image output device 102, gamma correction processing using the correction function represented by Formula 1, Formula 2, or the like may be performed on the target frame image.

Embodiment Mode 3

In this embodiment mode, the image output device 102 in FIG. 1 is described. FIGS. 10A and 10B illustrate a structural example of a liquid crystal display device used as the image output device 102. The liquid crystal display device includes a substrate provided with a circuit including a transistor, another substrate facing the substrate, and a liquid crystal layer interposed between these two substrates. FIG. 10A is a top plan view of the liquid crystal display device. FIG. 10B is a cross-sectional view along the line C-D in FIG. 10A. Note that in the liquid crystal display device of this embodiment mode, a circuit includes a top-gate transistor using a crystalline semiconductor film, and an MVA (multi-domain vertical alignment) mode is used as its display method.

In the liquid crystal display device illustrated in FIG. 10A, a pixel portion 5101, a first scan line driver circuit 5105a, a second scan line driver circuit 5105b, and a signal line driver circuit 5106 are formed over a substrate 5100. The pixel portion 5101, the first scan line driver circuit 5105a, the second scan line driver circuit 5105b, and the signal line driver circuit 5106 are sealed between the substrate 5100 and a substrate 5515 by a sealing material 5516. An FPC 5200 and an IC chip 5530 are provided over the substrate 5100 by a TAB method. A signal output from the image processing device 101 is input from the FPC 5200 to the liquid crystal display device.

A cross-sectional structure along the line C-D in FIG. 10A is described with reference to FIG. 10B. The pixel portion 5101 and a peripheral driver circuit portion (the first scan line driver circuit 5105a, the second scan line driver circuit 5105b, and the signal line driver circuit 5106) are formed over the substrate 5100. FIG. 10B illustrates two transistors 5519 and 5520 as a cross-sectional structure of a driver circuit region 5525 (the second scan line driver circuit 5105b) and one transistor as a cross-sectional structure of a pixel region 5526 (the pixel portion 5101).

An insulating film 5501 is formed as a base film over the substrate 5100. As the insulating film 5501, a single layer of an insulating film such as a silicon oxide film, a silicon nitride film, a silicon nitride oxide film, or a silicon oxynitride film; or a stacked layer including at least two of these films is used. Note that a silicon oxide film is preferably used for a portion in contact with a semiconductor. Thus, the electron trap level density in the base film is reduced, and hysteresis of transistor characteristics can be suppressed. Moreover, at least one film containing nitrogen is preferably provided as the base film. Accordingly, contamination of the liquid crystal display device by impurities contained in a glass substrate can be prevented, whereby a glass substrate can be applied to the substrate 5100.

A semiconductor film 5502 which forms a channel formation region, a source region, and a drain region of the transistor is formed over the insulating film 5501 by a photolithography method, an inkjet method, a printing method, or the like.

An insulating film 5503 is formed as a gate insulating film over the semiconductor film 5502. Note that as the insulating film 5503, a film with a single-layer structure or a stacked-layer structure of a thermal oxide film, a silicon oxide film, a silicon nitride film, or a silicon oxynitride film can be used. It is preferable that the insulating film 5503 with any structure include a silicon oxide film (including a silicon thermal oxide film) as a layer which is in contact with the semiconductor film 5502. This is because the trap level density at an interface between the semiconductor film 5502 and the insulating film 5503 is reduced when the silicon oxide film is used, as compared to the case of using other insulating films. Further, when a gate electrode is formed of a Mo film, it is preferable to use a silicon nitride film as a layer in the insulating film 5503, which is in contact with the gate electrode. This is because the silicon nitride film does not oxidize the Mo film. Here, as the insulating film 5503, a silicon oxide nitride film (a composition ratio: Si=32 at. %, O=59 at. %, N=7 at. %, and H=2 at. %) with a thickness of 115 nm is formed by a plasma CVD method.

Conductive films 5504 processed into predetermined shapes are formed over the insulating film 5503. The conductive film 5504 has a single-layer structure or a stacked-layer structure. Here, the conductive film 5504 is formed of a Mo film. It is preferable to use the Mo film as the conductive film 5504 because the Mo film can be easily etched and is resistant to heat. Note that the transistor 5521 has a dual-gate structure here, so that off current of the transistor 5521 is reduced. The dual-gate structure is a structure where one transistor has two gate electrodes. Note that the structure of the transistor 5521 is not limited to the dual-gate structure, and the transistor 5521 may have a single-gate structure or a structure where three or more gate electrodes are provided over one semiconductor film 5502.

An insulating film 5505 is formed as an interlayer film over the insulating film 5503 and the conductive film 5504 formed over the insulating film 5503. The insulating film 5505 can have a single-layer structure of a film made of an organic material or an inorganic material, or a stacked-layer structure of a plurality of films made of such materials. Examples of the inorganic material are silicon oxide, silicon nitride, silicon oxynitride, silicon nitride oxide, aluminum nitride, aluminum oxynitride, aluminum nitride oxide which contains more nitrogen than oxygen, aluminum oxide, diamond-like carbon (DLC), polysilazane, nitrogen-containing carbon (CN), PSG (phosphosilicate glass), BPSG (borophosphosilicate glass), and alumina. Moreover, the organic material can be a photosensitive material or a non-photosensitive material, and polyimide, acrylic, polyamide, polyimide amide, resist, benzocyclobutene, a siloxane resin, and the like can be used. Note that a siloxane resin corresponds to a resin having Si—O—Si bonds.

A contact hole is formed in the insulating films 5503 and 5505. For example, contact holes are formed so as to reach impurity regions of the transistors 5519 to 5521. Conductive films 5506 processed into predetermined shapes are formed as a drain electrode, a source electrode, and a wiring over the insulating film 5505. The conductive film 5506 has a single-layer structure or a stacked-layer structure. In a portion of the insulating films 5503 and 5505 where the contact hole is formed, the conductive film 5506 and the impurity region of the semiconductor film 5502 in the transistor are electrically connected to each other.

An insulating film 5507 is formed over the insulating film 5505. In a manner similar to the insulating film 5505, the insulating film 5507 can have a single-layer structure or a stacked-layer structure of a film made of an organic material or an inorganic material. When the insulating film 5507 serves as a planarization film, the insulating film 5507 preferably includes at least one layer made of the organic material because it preferably has high planarity and good coverage.

Next, a conductive film 5508 is formed over the insulating film 5507. The conductive film 5508 is a pixel electrode and is connected to the transistor 5521 through a contact hole formed in the insulating film 5507. An insulating film 5509 is formed as an alignment film over the conductive film 5508. An opening portion is formed in the conductive film 5508. By the opening portion, liquid crystal molecules can be aligned so as to be inclined with respect to a top surface of the conductive film 5509, so that the opening portion can have the same function as a protrusion in the MVA mode.

When a light-transmitting electrode is used for the pixel electrode, a light-transmitting conductive film which transmits light is used as the conductive film 5508. For example, an indium tin oxide film formed by mixing indium oxide with tin oxide, an indium tin silicon oxide film formed by mixing indium tin oxide with silicon oxide, an indium zinc oxide film formed by mixing indium oxide with zinc oxide, a zinc oxide film, a tin oxide film, or the like can be used. On the other hand, when a reflective electrode is used for the pixel electrode, a film with a signal-layer structure or a stacked-layer structure of a metal film of Ti, Mo, Ta, Cr, W, Al, or the like; or an alloy film or a compound film of the above metal can be formed as the conductive film 5508.

The sealing material 5516 is formed around the pixel portion 5101 or around the pixel portion 5101 and the driver circuits (5105a, 5105b, and 5106) by an inkjet method or the like. The substrate 5100 and the substrate 5515 which is provided with a conductive film 5512, an insulating film 5511, a protrusion 5551, and the like are attached to each other with a spacer 5531 therebetween. A liquid crystal layer 5510 is provided in a gap between the substrates. As illustrated in FIG. 10B, the spacer 5531 is formed using a resin film over the insulating film 5509, which is processed into a predetermined shape.

The substrate 5515 functions as an opposite substrate. The conductive film 5512 functions as an opposite electrode. As the conductive film 5512, a light-transmitting conductive film used for the conductive film 5508 can be formed. The insulating film 5511 functions as an alignment film.

The FPC 5200 is provided over a conductive film 5518 which is electrically connected to the pixel portion 5101 and the driver circuits (5105a, 5105b, and 5106) with an anisotropic conductive layer 5517 therebetween. Moreover, the IC chip 5530 is provided over the FPC 5200 with the anisotropic conductive layer 5517 therebetween. That is, the FPC 5200, the anisotropic conductive layer 5517, and the IC chip 5530 are electrically connected to each other.

Note that the anisotropic conductive layer 5517 has a function of transmitting a potential and a signal input from the FPC 5200 to the pixel portion 5101 and the driver circuits (5105a, 5105b, and 5106). As the anisotropic conductive layer 5517, a material similar to that of the conductive film 5506, the conductive film 5504, or the impurity region of the semiconductor film 5502; or a combination of at least these two layers may be used.

The IC chip 5530 is not necessarily provided. When the IC chip 5530 includes a functional circuit (a memory or a buffer), the area of the substrate can be efficiently used.

Note that although the display method of the liquid crystal display device in FIG. 10B is the MVA mode, the present invention is not limited to an MVA-mode liquid crystal display device. For example, a PVA (patterned vertical alignment) mode may be employed. In the case of using the PVA mode, the conductive film 5512 on the substrate 5515 may be provided with a slit so that liquid crystal molecules are aligned to be inclined. Further, a protrusion (also referred to an alignment control protrusion) which is similar to the protrusion 5551 may be provided on the conductive film 5512 provided with the slit so that liquid crystal molecules are aligned to be inclined. A method for driving liquid crystal is not limited to the MVA mode and the PVA mode, and for example, the following mode can be applied: a TN (twisted nematic) mode, an IPS (in-plane-switching) mode, an FFS (fringe field switching) mode, an ASM (axially symmetric aligned micro-cell) mode, an OCB (optical compensated birefringence) mode, an FLC (ferroelectric liquid crystal) mode, and an AFLC (antiferroelectric liquid crystal) mode.

Embodiment Mode 4

In this embodiment mode, a structural example of the image display system in the present invention is described.

Figure 11:
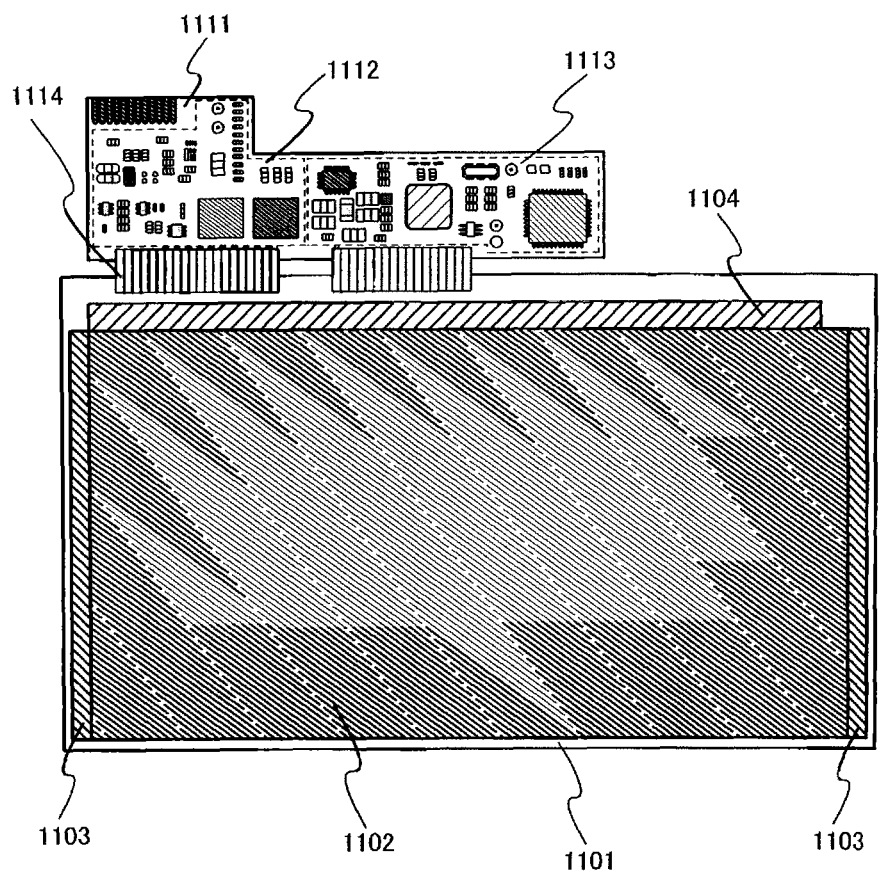
FIG. 11 illustrates a structural example of an image display system.

FIG. 11 illustrates a structural example of an image display system in which a display device 1101 and a circuit board 1111 are combined together. For the display device 1101, the liquid crystal display device in Embodiment Mode 3 is used, for example. The circuit board 1111 is provided with the image processing device 101. The display device 1101 corresponds to the image output device 102. The display device 1101 includes a pixel portion 1102, scan line driver circuits 1103, and a signal line driver circuit 1104. The circuit board 1111 is provided with a control circuit 1112 and an arithmetic circuit 1113, for example. The display device 1101 and the circuit board 1111 are connected to each other by a connection wiring 1114. An FPC or the like can be used for the connection wiring 1114.

The pixel portion 1102 and part of peripheral driver circuits (e.g., a driver circuit with low operation frequency among a plurality of driver circuits) may be formed over the same substrate by using transistors, and another part of the peripheral driver circuits (e.g., a driver circuit with high operation frequency among the plurality of driver circuits) may be formed in an IC chip. Then, the IC chip may be mounted on the display device 1101 by COG (chip on glass) or the like. Thus, the area of the circuit board 1111 can be reduced, and the small display device 1101 can be obtained. Alternatively, the IC chip may be mounted on the display device 1101 by using TAB (tape automated bonding) or a printed wiring board. Thus, the display device 1101 with a narrower frame (outer edge region of a substrate, which does not function as a screen) can be obtained.

For example, in order to reduce power consumption, a pixel portion may be formed over a glass substrate by using transistors, and all peripheral circuits may be formed in an IC chip. Then, the IC chip may be mounted on the display device 1101 by COG or TAB.

In addition, a television receiver can be completed with the image display system illustrated in FIG. 11. By applying the image display system of the present invention to the television receiver, a viewer can see a television program as an image with enhanced depth.

Figure 12A:
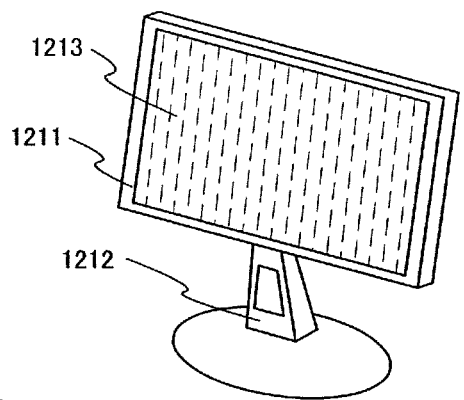
FIGS. 12A to 12C are external views each illustrating an electronic device to which an image display system is applied (FIG. 12A illustrates a monitor.
Figure 12B:
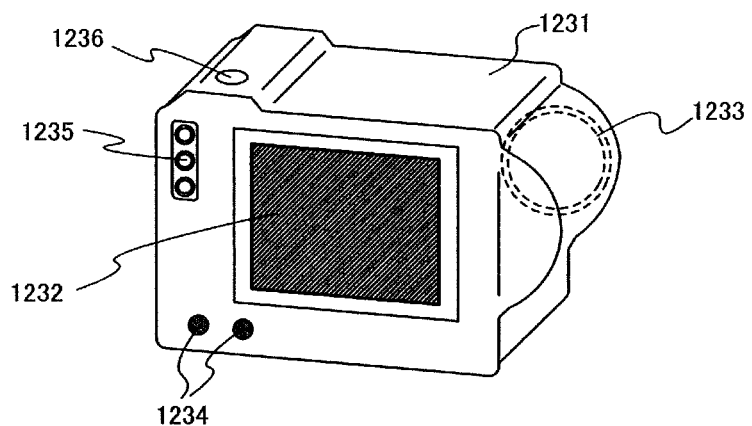
Figure 12C:
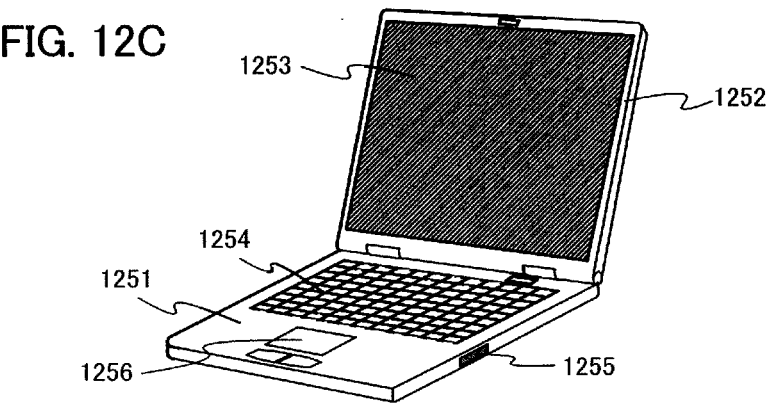

The image display system of the present invention can be applied to a variety of electronic devices. Examples of such an electronic device are cameras such as video cameras and digital cameras, goggle displays, navigation systems, audio reproducing devices (e.g., car audio systems and audio component sets), computers, game machines, portable information terminals (e.g., mobile computers, cellular phones, portable game machines, and e-book readers), and image reproducing devices provided with a storage medium (specifically, a device for reproducing image data and audio data stored in a storage medium such as a digital versatile disc (DVD)). Hereinafter, examples of electronic devices are described with reference to FIGS. 12A to 12C. FIGS. 12A to 12C are each an external view of an electronic device.

FIG. 12A is an external view of a monitor. The monitor includes a housing 1211, a support base 1212, and a display portion 1213. The monitor illustrated in FIG. 12A has a function of displaying various kinds of information (e.g., a still image, a moving image, and a text image) in the display portion. Note that the monitor illustrated in FIG. 12A can have various functions without being limited to the above function.

FIG. 12B is an external view of a camera. The camera includes a main body 1231, a display portion 1232, an image receiving portion 1233, operation keys 1234, an external connection port 1235, and a shutter button 1236. The camera illustrated in FIG. 12B has a function of photographing a still image and a moving image. The camera is provided with an image processing device for correcting a photographed moving image and still image. Accordingly, the moving image can be corrected in the camera, and a corrected moving image can be written to various kinds of storage media. Note that the camera illustrated in FIG. 12B can have various functions without being limited to the above functions.

FIG. 12C is an external view of a computer. The computer includes a main body 1251, a housing 1252, a display portion 1253, a keyboard 1254, an external connection port 1255, and a pointing device 1256. The computer also includes an image processing device of the present invention. The computer illustrated in FIG. 12C has a function of displaying various kinds of information (e.g., a still image, a moving image, and a text image) in the display portion. Image processing is performed on a moving image in response to input by the keyboard 1254 or the pointing device 1256, for example. Note that the computer illustrated in FIG. 12C can have various functions without being limited to the above functions.

This embodiment mode can be implemented in combination with other embodiment modes as appropriate.

This application is based on Japanese Patent Application serial No. 2007-302812 filed with Japan Patent Office on Nov. 22, 2007, the entire contents of which are hereby incorporated by reference.

The invention claimed is:

1. An image processing method for processing a moving image including a plurality of frame images, comprising the steps of:
   extracting a moving object display region where a moving object is displayed from image at least one frame image;
   determining whether the moving object display region accounts for more than a value of proportion of a target frame image; and
   performing a first kind of image processing on a pixel included in the moving object display region and performing a second kind of image processing on a pixel which is not included in the moving object display region in the frame image to generate a correction frame image when the moving object display region accounts for less than a value of proportion of a frame image,
   displaying the target frame image on an image display portion without forming the correction frame image when the moving object display region accounts for more than the value of proportion of the target frame image,
   wherein the first kind of image processing is different from the second kind of image processing,
   wherein the second image processing comprises blurring processing, and
   wherein at least one kind of image processing among contrast conversion processing for reducing contrast and mosaic processing is performed as the blurring processing.

2. An image processing method for processing a moving image including a plurality of frame images, comprising the steps of:
   generating a first binary difference image based on a difference image between a target frame image to be subjected to correction and a frame image which is k frame or k frames before the target frame image where k is one of 1 and 2;
   generating a second binary difference image based on a difference image between the target frame image and a frame image which is k frame or k frames after the target frame image;
   extracting a moving object display region from a logical product of the first binary difference image and the second binary difference image to generate a mask image formed from the moving object display region and a background display region;

determining whether the moving object display region accounts for more than a value of proportion of the target frame image; and performing a first kind of image processing on a pixel in the same position as a pixel included in the moving object display region and performing a second kind of image processing a pixel in the same position as a pixel included in the background display region in the target frame image to generate a correction frame image when the moving object display region accounts for less than the value of proportion of the frame image, displaying the target frame image on an image display portion without forming the correction frame image when the moving object display region accounts for more than the value of proportion of the target frame image, wherein the first kind of image processing is different from the second kind of image processing, wherein the second image processing includes blurring processing, and wherein at least one kind of image processing among contrast conversion processing for reducing contrast and mosaic processing is performed as the blurring processing.

3. The image processing method according to claim 1, wherein the first kind of image processing comprises at least one of sharpening processing, contrast enhancement processing, and edge enhancement processing performed on the pixel included in the moving object display region.

4. The image processing method according to claim 2, wherein the first kind of image processing comprises at least one of sharpening processing, contrast enhancement processing, and edge enhancement processing performed on the pixel in the same position as the pixel included in the moving object display region.

5. The image processing method according to claim 2 or claim 4, wherein the second kind of image processing comprises at least one of averaging processing, contrast conversion processing for reducing contrast, noise removal processing, and mosaic processing performed as the blurring processing.

6. An image display system comprising:

an image display portion for displaying a moving image including a plurality of frame images;

a moving object region extraction portion for extracting a moving object display region where a moving object is displayed from frame image at least one frame image;

a processing portion for determining whether the moving object display region accounts for more than a value of proportion of a target frame image; and a correction frame image generation portion for generating a correction frame image by performing a first kind of image processing on a pixel included in the moving object display region and performing a second kind of image processing on a pixel which is not included in the moving object display region in the frame image, wherein the first kind of image processing is different from the second kind of image processing, wherein the second image processing comprises blurring processing, wherein the correction frame image is displayed on the image display portion when the moving object display region accounts for less than the value of proportion of the frame image, and wherein the target frame image is displayed on the image display portion without forming the correction frame image when the moving object display region accounts for more than the value of proportion of the target frame image.

7. An image display system comprising:

an image display portion for displaying a moving image including a plurality of frame images;

a binary difference image generation portion for generating a first binary difference image based on a difference image between a target frame image to be subjected to correction and a frame image which is k frame or k frames before the target frame image and for generating a second binary difference image based on a difference image between the target frame image and a frame image which is k frame or k frames after the target frame image where k is one of 1 and 2;

a mask image generation portion for extracting a moving object display region from a logical product of the first binary difference image and the second binary difference image to generate a mask image formed from the moving object display region and a background display region;

a processing portion for determining whether the moving object display region accounts for more than a value of proportion of the target frame image; and a correction frame image generation portion for performing a first kind of image processing on a pixel in the same position as a pixel included in the moving object display region and performing a second kind of image processing a pixel in the same position as a pixel included in the background display region in the target frame image to generate a correction frame image, wherein the first kind of image processing is different from the second kind of image processing, wherein the second kind of image processing comprises blurring processing, wherein the correction frame image is displayed on the image display portion when the moving object display region accounts for less than the value of proportion of the frame image, and wherein the target frame image is displayed on the image display portion without forming the correction frame image when the moving object display region accounts for more than the value of proportion of the target frame image.

8. The image display system according to claim 6, wherein the first kind of image processing comprises at least one of sharpening processing, contrast enhancement processing, and edge enhancement processing performed on the pixel included in the moving object display region.

9. The image display system according to claim 7, wherein the first kind of image processing comprises at least one of sharpening processing, contrast enhancement processing, and edge enhancement processing performed on the pixel in the same position as the pixel included in the moving object display region.

10. The image display system according to any one of claims 6 to 9, wherein the second kind of image processing comprises at least one of averaging processing, contrast conversion processing for reducing contrast, noise removal processing, and mosaic processing performed as the blurring processing.

11. An image processing device for a moving image, comprising:

a data storage portion for storing a computer program, a moving object region extraction portion for extracting a moving object display region where a moving object is displayed from a frame image forming a moving image;

a processing portion for determining whether the moving object display region accounts for more than a value of proportion of a target frame image; and a correction frame image generation portion for performing a first kind of image processing on a pixel included in the moving object display region and performing a second kind of image processing on a pixel which is not included in the moving object display region in the frame image to generate a correction frame image when the moving object display region accounts for less than the value of proportion of the frame image, wherein the first kind of image processing is different from the second kind of image processing, wherein the second kind of image processing comprises blurring processing, wherein at least one kind of image processing among contrast conversion processing for reducing contrast and mosaic processing is performed as the blurring processing, and wherein the target frame image is displayed on an image display portion without forming the correction frame image when the moving object display region accounts for more than the value of proportion of the target frame image.

12. An image processing device for a moving image, comprising:

a data storage portion for storing a computer program, a binary difference image generation portion for generating a first binary difference image based on a difference image between a target frame image to be subjected to correction among a plurality of target frame images forming a moving image and a frame image which is k frame or k frames before the target frame image where k is one of 1 and 2, and for generating a second binary difference image based on a difference image between the target frame image and a frame image which is k frame or k frames after the target frame image;

a mask image generation portion for extracting a moving object display region from a logical product of the first binary difference image and the second binary difference image to generate a mask image formed from the moving object display region and a background display region;

a processing portion for determining whether the moving object display region accounts for more than a value of proportion of the target frame image; and a correction frame image generation portion for performing a first kind of image processing on a pixel in the same position as a pixel included in the moving object display region and performing a second kind of image processing on a pixel in the same position as a pixel included in the background display region in the target frame image to generate a correction frame image when the moving object display region accounts for less than the value of proportion of the frame image, wherein the first kind of image processing is different from the second kind of image processing, wherein the second kind of image processing comprises blurring processing, wherein at least one kind of image processing among contrast conversion processing for reducing contrast and mosaic processing is performed as the blurring processing, and wherein the target frame image is displayed on an image display portion without forming the correction frame image when the moving object display region accounts for more than the value of proportion of the target frame image.

13. The image processing device according to claim 11, wherein the first kind of image processing comprises at least one of sharpening processing, contrast enhancement processing, and edge enhancement processing performed on the pixel included in the moving object display region.

14. The image processing device according to claim 12, wherein the first kind of image processing comprises at least one of sharpening processing, contrast enhancement processing, and edge enhancement processing performed on the pixel in the same position as the pixel included in the moving object display region.

15. A computer-readable non-transitory memory device storing a computer program for implementation by an image processing device for processing a moving image, the computer program comprising code segments configured to cause the image processing device to:

extract from a frame image forming a moving image a moving object display region in which a moving object is displayed;

determine whether the moving object display region accounts for more than a value of proportion of a target frame image; and perform a first kind of image processing on a pixel included in the moving object display region and perform a second kind of image processing on a pixel which is not included in the moving object display region to generate a correction frame image when the moving object display region accounts for less than the value of proportion of the frame image, displaying the target frame image on an image display portion without forming the correction frame image when the moving object display region accounts for more than the value of proportion of the target frame image, wherein the second kind of image processing comprises blurring processing.

16. A computer-readable non-transitory memory device storing a computer program for implementation by an image processing device processing for a moving image, the computer program comprising code segments configured to cause the image processing device to:

generate a first binary difference image based on a difference image between a target frame image to be subjected to correction among a plurality of target frame images forming a moving image and a frame image which is k frame(s) before the target frame image, wherein k is one of 1 and 2;

generate a second binary difference image based on a difference image between the target frame image and a frame image which is k frame(s) after the target frame image;

extract a moving object display region from a logical product of the first binary difference image and the second binary difference image to generate a mask image formed from the moving object display region and a background display region;

determine whether the moving object display region accounts for more than a value of proportion of the target frame image; and perform a first kind of image processing on a pixel in the same position as a pixel included in the moving object display region and performing a second kind of image processing on a pixel in the same position as a pixel included in the background display region in the target frame image to generate a correction frame image when the moving object display region accounts for less than the value of proportion of the frame image, displaying the target frame image on an image display portion without forming the correction frame image when the moving object display region accounts for more than the value of proportion of the target frame image, wherein the second kind of image processing comprises blurring processing.

17. The computer readable non-transitory memory device according to claim 15, wherein the first kind of image processing comprises at least one of sharpening processing, contrast enhancement processing, and edge enhancement processing.

18. The computer readable non-transitory memory device according to claim 16, wherein the first kind of image processing comprises at least one of sharpening processing, contrast enhancement processing, and edge enhancement processing.

19. The computer readable non-transitory memory device according to any one of claims 15 to 18, wherein the blurring processing comprises at least one of averaging processing, contrast conversion processing for reducing contrast, noise removal processing, and mosaic processing.

20. An image processing method for processing a moving image including a plurality of frame images, comprising the steps of:

extracting a moving object display region where a moving object is displayed from at least one frame image to generate a mask image formed from the moving object display region and a background display region;

determining whether the moving object display region accounts for more than a value of proportion of a target frame image; and performing a first kind of image processing on a pixel included in the moving object display region and performing a second kind of image processing a pixel which is not included in the moving object display region in the frame image to generate a correction frame image when the moving object display region accounts for less than a value of proportion of a frame image, displaying the target frame image on an image display portion without forming the correction frame image when the moving object display region accounts for more than the value of proportion of the target frame image, wherein the second kind of image processing comprises blurring processing, wherein at least one kind of image processing among contrast conversion processing for reducing contrast, and mosaic processing is performed as the blurring processing.

21. An electronic device comprising the image display system according to claim 6.

22. The image processing method according to claim 1, wherein the value of proportion of the target frame is in a range of 50%-70%.

23. The image processing method according to claim 2, wherein the value of proportion of the target frame is in a range of 50%-70%.

24. The image display system according to claim 6, wherein the value of proportion of the target frame is in a range of 50%-70%.

25. The image display system according to claim 7, wherein the value of proportion of the target frame is in a range of 50%-70%.

26. The image processing device according to claim 11, wherein the value of proportion of the target frame is in a range of 50%-70%.

27. The image processing device according to claim 12, wherein the value of proportion of the target frame is in a range of 50%-70%.

28. The computer readable non-transitory memory device according to claim 15, wherein the value of proportion of the target frame is in a range of 50%-70%.

29. The computer readable non-transitory memory device according to claim 16, wherein the value of proportion of the target frame is in a range of 50%-70%.

30. The image processing method according to claim 20, wherein the value of proportion of the target frame is in a range of 50%-70%.

* * * * *